United States Patent
Carstensen et al.

(10) Patent No.: US 11,761,489 B2
(45) Date of Patent: Sep. 19, 2023

(54) GEAR-TOOTH SYSTEM AND SHAFT/HUB CONNECTION COMPONENT

(71) Applicant: GKN Driveline Deutschland GmbH, Kiel (DE)

(72) Inventors: Rainer Carstensen, Eckenförde (DE); Artur Mattheis, Barsbek (DE); Sven Krämer, Eutin (DE)

(73) Assignee: GKN Driveline Deutschland GmbH, Kiel (DE)

( * ) Notice: Subject to any disclaimer, the term of this patent is extended or adjusted under 35 U.S.C. 154(b) by 0 days.

(21) Appl. No.: 17/617,013

(22) PCT Filed: Jun. 14, 2019

(86) PCT No.: PCT/EP2019/065631
§ 371 (c)(1),
(2) Date: Dec. 7, 2021

(87) PCT Pub. No.: WO2020/249223
PCT Pub. Date: Dec. 17, 2020

(65) Prior Publication Data
US 2022/0235826 A1    Jul. 28, 2022

(51) Int. Cl.
*B21H 5/02* (2006.01)
*F16D 1/116* (2006.01)
*F16D 1/10* (2006.01)

(52) U.S. Cl.
CPC ............ *F16D 1/116* (2013.01); *B21H 5/022* (2013.01); *F16D 1/101* (2013.01); *F16D 2001/103* (2013.01); *F16D 2250/0023* (2013.01)

(58) Field of Classification Search
CPC ......... Y10T 403/7035; Y10T 403/7026; Y10T 403/7028; Y10T 403/7031;
(Continued)

(56) References Cited

U.S. PATENT DOCUMENTS 3,145,590 A    8/1964    Nell
4,414,780 A *  11/1983   Jorgensen ............... B23F 23/12
                                                    451/392
(Continued)

FOREIGN PATENT DOCUMENTS

DE    91 16 324 U1    8/1992
DE    697 15 944 T2   8/2003
(Continued)

OTHER PUBLICATIONS

International Search Report and Written Opinion dated Mar. 25, 2020 for PCT/EP2019/065631 (10 pages).

*Primary Examiner* — Sarang Afzali
*Assistant Examiner* — Darrell C Ford
(74) *Attorney, Agent, or Firm* — Bejin Bieneman PLC

(57) ABSTRACT

A gear-tooth system can be produced on a component of a shaft/hub connection. The component can have a first axis of rotation and a gear-tooth system; wherein the gear-tooth system of the component comprises a plurality of teeth, disposed next to one another along a circumference direction, wherein a tooth interstice is disposed between two teeth, in each instance, and each tooth has a head region and a flank region, in each instance, between head region and a foot region disposed in the tooth interstice, wherein the tooth interstice has a tooth gap width in the flank region; wherein the gear-tooth system has at least a first region and subsequently a second region along an axial direction parallel to the first axis of rotation; wherein the first region has a first tooth gap width and the second region has a second tooth gap width, which is less in comparison.

7 Claims, 5 Drawing Sheets

(58) Field of Classification Search
CPC ......... Y10T 403/7032; Y10T 403/7033; Y10T 29/477; Y10T 29/49471; F16D 2001/103; F16D 1/116; F16D 1/101; F16D 2250/0023; B21H 5/022; B21K 1/066; B23P 15/14

See application file for complete search history.

(56) References Cited

U.S. PATENT DOCUMENTS

| | | | | |
|---|---|---|---|---|
| 5,197,317 | A * | 3/1993 | Della Torre | B21H 7/14 72/102 |
| 6,151,941 | A * | 11/2000 | Woolf | B21H 5/022 72/102 |
| 6,170,156 | B1 * | 1/2001 | Lev | B21H 5/022 29/893.1 |
| 8,201,471 | B2 * | 6/2012 | Ohmi | F16H 55/0886 74/462 |
| 2006/0199652 | A1 * | 9/2006 | Fuhrmann | F16D 1/10 464/158 |
| 2006/0261517 | A1 * | 11/2006 | Ojima | B23P 15/14 264/261 |
| 2007/0178975 | A1 * | 8/2007 | Neugebauer | F16C 3/03 464/51 |
| 2008/0168640 | A1 * | 7/2008 | Han | B21H 5/022 29/90.6 |
| 2010/0224145 | A1 * | 9/2010 | Mueller | F16H 53/025 29/888.1 |
| 2011/0268524 | A1 | 11/2011 | Prock et al. | |
| 2012/0079913 | A1 * | 4/2012 | Dollinger | F01L 13/0042 74/567 |
| 2013/0118283 | A1 * | 5/2013 | Tumback | F02N 15/06 29/893 |
| 2017/0175872 | A1 * | 6/2017 | Altamura | F16H 57/023 |
| 2017/0298993 | A1 | 10/2017 | Mabe | |

FOREIGN PATENT DOCUMENTS

| | | |
|---|---|---|
| DE | 103 02 072 B3 | 9/2004 |
| DE | 10 2005 035 706 B4 | 1/2008 |
| DE | 11 2005 003 630 B4 | 4/2013 |
| EP | 3398710 A2 | 11/2018 |
| WO | 2018014889 A1 | 1/2018 |

* cited by examiner

GEAR-TOOTH SYSTEM AND SHAFT/HUB CONNECTION COMPONENT

CROSS-REFERENCE TO RELATED APPLICATIONS

This application is a national stage of, and claims priority to, Patent Cooperation Treaty Application No. PCT/EP2019/065631, filed on Jun. 14, 2019, which application is hereby incorporated herein by reference in its entirety.

BACKGROUND

An arrangement having a profiled gear-tooth system between a shaft journal and a hub is known from DE 91 16 324. At least one of the profiled gear-tooth systems has a narrowed tooth width with an unchanged tooth height at its end that is at the front when the gear-tooth systems are joined together.

A shaft/hub connection arrangement having gear-tooth systems on shaft and hub, which engage into one another, is known from DE 10 2005 035 706 B4. The gear-tooth systems have a minimal tooth gap width in a first region and a maximal tooth gap width in a second region. During joining of the gear-tooth systems, the regions having the maximal tooth gap width come into engagement with one another at first, so that here, low pressure and/or a transition fit or a play fit between the gear-tooth systems is present. Toward the end of joining of the gear-tooth systems, a region having a minimal tooth gap width then comes into engagement with a region having a maximal tooth gap width, in each instance, so that here, stronger pressure and/or a press fit is present between the gear-tooth systems.

Such pairings of gear-tooth systems allow easier axial joining of the components by way of the gear-tooth system, since the flanks of the teeth of the gear-tooth systems, which flanks lie opposite one another, only come to bear after a certain press-in length, and with one another form the fit (for example a press fit) for the later purpose of use.

In this way, joining of gear-tooth systems can be simplified, since the risk of tilting can be reduced. It would be possible to place the components with a greater position tolerance relative to one another, wherein a more precise (self) orientation of the components relative to one another takes place only during the course of joining.

However, production of such gear-tooth systems is problematical, in particular if the gear-tooth systems are supposed to be produced in large numbers and during a short cycle time. Furthermore, it should be possible to produce the gear-tooth systems without burrs, if at all possible, i.e. so as not to require any rework (for example to remove burrs), if at all possible. Burrs on the gear-tooth systems are problematical, since they are displaced into the region of the subsequent bearing connection between the tooth flanks during joining, and in this regard hinder joining, for one thing, and for another thing can influence the bearing behavior of the gear-tooth systems that are in engagement with one another. In particular, burrs lead to scraping off of material during joining of non-hardened hubs, which material can then greatly increase the axial joining force. In this regard, the maximally permissible joining force is often exceeded. The scraped-off material can furthermore be pressed into a groove provided in the gear-tooth system, and there hinder the function of a locking ring to be disposed in the groove.

A method for producing a stepped gear-tooth system is known from DE 11 2005 003 630 B4. In this regard, a component of a shaft/hub connection is permanently held in a chuck, and is given an at least two-stage gear-tooth system by means of a tool.

SUMMARY

The present disclosure includes a method for producing a gear-tooth system, for example on a hub (inner gear-tooth system) or on a shaft (outer gear-tooth system). The disclosure furthermore includes a component of a shaft/hub connection, which component has a gear-tooth system.

A method includes producing a gear-tooth system (in particular a wedge gear-tooth system) on a component of a shaft/hub connection. The component is a shaft and/or a hub, therefore the gear-tooth system is an outer gear-tooth system disposed on an outer circumference surface or an inner gear-tooth system disposed on an inner circumference surface. The components of the shaft/hub connection are connected with one another by way of the gear-tooth system, so that a shape-fit connection between the components is implemented by way of the gear-tooth system, at least relative to a circumferential direction.

The component has a first axis of rotation and a gear-tooth system. The gear-tooth system of the component comprises a plurality of teeth (having the same configuration), which are disposed next to one another along a circumferential direction (at equal intervals), wherein a tooth interstice is disposed between two teeth, in each instance, and each tooth has a head region and a flank region, in each instance, disposed between the head region and a foot region disposed in the tooth interstice. The tooth interstice has a tooth gap width in the flank region. The gear-tooth system has at least a first region and subsequently a second region along an axial direction parallel to the first axis of rotation. The first region has a first tooth gap width and the second region has a second tooth gap width, which is less in comparison. The method (for producing this gear-tooth system) comprises at least the following steps:

a) making the component available in a first initial state, wherein the component has the gear-tooth system, wherein the gear-tooth system has the second tooth gap width in the first region and in the second region;

b) machining at least the first region and enlarging the second tooth gap width to form the first tooth gap width.

The gear-tooth system is a straight gear-tooth system, in which the teeth extend exclusively along the axial direction. The gear-tooth system can also be a slanted gear-tooth system, in which the teeth additionally extend along the circumference direction. The form of the gear-tooth system is not limited.

The gear-tooth system is an involute gear-tooth system.

The component forms a gear wheel having an outer gear-tooth system and/or an inner gear-tooth system. The gear-tooth system has a uniform division (in other words an arrangement of equal teeth along the circumference direction, with equal intervals). The gear wheel therefore has a modulus (diameter division; generally used dimension for describing gear-tooth systems).

The tooth gap width changes along a radial direction between head region and foot region of the teeth. Here, the (first and second) tooth gap width is determined, in each instance, at an equal distance from the first axis of rotation. The tooth gap width is determined in the flank region of the teeth. A partial circle (or rolling circle) extends through the flank region. In particular, the tooth gap width is determined on the partial circle.

Here, the flank region refers to the region of a gear-tooth system of a shaft/hub connection intended for contacting the teeth of shaft and hub.

Here it is possible to structure the gear-tooth system uniformly at first (at least with regard to the tooth gap width), and to make it available with the same tooth gap width (with the lower second tooth gap width) according to Step a).

In particular, here the gear-tooth system can already be structured with steps, for example (in other words foot regions or head regions of the gear-tooth system that are structured differently).

In particular, the gear-tooth system can have a slanted position of the teeth (in other words a progression at an angle relative to an axial direction); in other words it can form a helix gear-tooth system, for example.

According to Step b), the first region is machined and the tooth gap width is enlarged.

Machining takes place by means of displacement and/or by means of removal of material of the component.

A different tool is used for producing the first tooth gap width than for producing the gear-tooth system or for producing the second tooth gap width.

Step b) can take place in a separate production step, for example on a different machine and/or in a different clamping process and/or with a time offset relative to production of the gear-tooth system having the second tooth gap width.

Step b) can take place after introduction of one or more grooves, in terms of time.

Step b) can be carried out using a rolling tool. Using a rolling tool, it is possible to achieve (local) displacement and/or compaction of the material of the component by means of a roll-off movement between tool and component.

Alternatively, Step b) can be carried out using a drawing tool, in other words formation of the gear-tooth system can be carried out within the scope of impact extrusion (during which the component is pressed into or through a die that forms the gear-tooth system—or vice versa).

A drawing tool is fundamentally known, wherein a drawing die is explained in greater detail in DE 11 2005 003 630 B4, for example.

In particular, the rolling tool is
- a rolling rod that is moved at least transverse to the first axis of rotation relative to the component, so as to produce the gear-tooth system; or
- a roller burnishing tool having at least one rolling wheel, wherein the rolling wheel has a second axis of rotation that runs parallel to the first axis of rotation.

The rolling rod and the rolling wheel are fundamentally known and are explained in greater detail in DE 11 2005 003 630 B4, for example.

Targeted displacement of material out of the flank region can take place by means of rolling. In particular, the material displacement can take place at least in the radial direction, in other words toward a foot region and/or toward a head region of the teeth. In these regions, in general no contacting with the other component of the shaft/hub connection is provided for during planned use of the component. In this way, additional material can be placed here, without disadvantages having to be feared during subsequent use of the component.

The rolling tool can be a roller burnishing tool, wherein the at least one rolling wheel for producing the engagement into the gear-tooth system is moved at least (preferably exclusively) transverse to the axial direction, at an infeed speed. Immediately before contact between rolling wheel and component, at least the component rotates about the first axis of rotation or the one rolling wheel rotates about the second axis of rotation.

In particular, a rolling wheel can machine all gear-tooth systems that have the same modulus, independent of the number of teeth of the component to be machined.

Only one of (at least one) rolling wheel and component is driven, so that a rotational movement of the one part (rolling wheel or component) is transferred to the other part (component or rolling wheel).

The roller burnishing tool is moved toward the component at an infeed speed, wherein within the scope of this infeed movement, the contact, the engagement into the gear-tooth system (in other words the interaction between the gear-tooth system on the rolling wheel and on the component) and, if applicable, also the transfer of the rotational movement from the one part to the other part takes place.

The infeed speed (at least immediately before and during contact and engagement) can is at least 0.2 millimeters/second, preferably at least 1.0 millimeters/second, particularly preferably at least 8.0 millimeters/second. For example, the infeed speed can is between 0.2 millimeters/second and 10 millimeters/second, particularly at most 6 millimeters/second.

A rotational speed of the component (and thereby of the at least one rolling wheel) during Step b) can is at least 100 revolutions/minute, preferably at least 200 revolutions/minute, particularly preferably at least 400 revolutions/minute. For example, the rotational speed can is between 100 revolutions/minute and 1,000 revolutions/minute, preferably between 100 and 600 revolutions/minute.

With the proposed rolling methods for carrying out Step b), it is possible to implement a very short cycle time for Step b), so that a great number of components can be produced within a short time. In this regard, high quality of the gear-tooth system can be implemented, wherein burrs are removed by means of the rolling method or do not occur in the first place.

In particular, a groove that runs in the circumference direction can be introduced into the gear-tooth system between Step a) and b), within the first region. This groove is necessary for the subsequent purpose of use of the component.

Introduction of the groove, which in particular reaches into the component more deeply than the foot region of the gear-tooth system, usually takes place by means of a material-removing method, for example lathing. In particular, in this regard burrs are formed at the edges between groove and gear-tooth system. These burrs are reshaped or broken by means of the machining according to Step b), in such a manner that they no longer reach into the tooth gaps and no longer have a negative influence on joining with a hub, for example. An additional machining step for removing the burrs is therefore not required.

In particular, during Step b), a material of the component is displaced out of the flank region, at least (for the most part or exclusively within the first region) in a radial direction, at least in the first region, at least toward the head region or toward the foot region. Displacement of material in the axial direction can occur in the edge region of the first region (in other words at the transition to the second region, for example). An accumulation of material, which occurs, for example, when using a drawing tool, and reduces the tooth gap width of the teeth already present, does not occur here.

In particular, a transition region can be provided between the first region and the second region, in which the first tooth gap width continuously decreases along the axial direction, toward the second tooth gap width. To implement this transition region, the rolling tool can have a corresponding shape, for example, so that increasingly lesser engagement between rolling tool and gear-tooth system of the component takes place toward the edge of the rolling tool.

The first tooth gap width produced according to Step b) (as an average over multiple measurement points) cam be at least 1 micrometers, preferably at least 10 micrometers, particularly preferably at least 100 micrometers greater than the second tooth gap width, measured at the same position (same diameter; if possible same tooth).

Furthermore, a component of a shaft/hub connection is disclosed. The component has a first axis of rotation and a gear-tooth system. The gear-tooth system comprises a plurality of teeth, which are disposed next to one another along a circumference direction, wherein a tooth interstice is disposed between two teeth, in each instance, and each tooth has a head region and a flank region, in each instance, disposed between the head region and a foot region disposed in the tooth interstice. The tooth interstice has a tooth gap width in the flank region. The gear-tooth system has at least a first region and subsequently a second region along an axial direction parallel to the first axis of rotation; wherein the first region has a first tooth gap width and the second region has a lesser second tooth gap width in comparison with the first.

The component is produced at least by means of the method described. Alternatively or in addition, the first tooth gap width decreases continuously, proceeding from a first region end of the first region and toward the second region, at least in a partial region.

In particular, in the entire first region, the first tooth gap width is greater than the second tooth gap width in the second region.

The gear-tooth system extends, at least proceeding from a first region end of the first region, along the axial direction, over the first region (and, if applicable, the groove), if applicable over a transition region, and over the second region.

The partial region can form the first region end, and at least a remaining region having a constant first tooth gap width can be disposed between the partial region and the second region. The remaining region is part of the first region. The remaining region is disposed (at least) between the partial region and the groove. If applicable, the remaining region extends beyond the groove.

The teeth are structured conically, at least in the partial region, i.e. they widen continuously toward the second region.

A transition region can be formed between the first region and the second region as well as the partial region, wherein, however, the first tooth gap width decreases to the second tooth gap width in the transition region.

Furthermore, a shaft/hub connection is disclosed, at least comprising a shaft and a hub, which have a gear-tooth system, in each instance, by way of which they are connected with one another (with shape fit relative to the circumference direction). At least one of the parts, shaft and hub, is the component described. For forming the shaft/hub connection, the shaft and the hub can be displaced relative to one another by way of a first component end (of the component shaft and of the component hub; for example an end face), along an axial direction, toward one another. The first region of the respective component (which is structured like the component described, in other words one of shaft and hub or both) is disposed between the first component end of the component and the second region of the component.

If shaft and hub are arranged one on top of the other, in other words displaced toward one another, first the first region of the gear-tooth system of the component described will come into engagement with the gear-tooth system of the other component, shaft and hub. The first region has the enlarged tooth gap width, so that assembly of the shaft/hub connection is simplified.

The gear-tooth systems (of shaft and hub) at first can form a greater fit during formation of the shaft/hub connection (for example a play fit) with one another (if, for example, only the first region is in engagement with the respective other gear-tooth system). During further displacement of shaft and hub relative to one another and when a predetermined end position is reached, the gear-tooth systems form a tighter fit (for example a press fit) with one another, at least in the second region of the gear-tooth system of the component.

The explanations regarding the method can be transferred to the component and the shaft/hub connection, and vice versa, in each instance.

As a precaution, it should be noted that the counting words used here ("first," "second," . . . ) serve primarily (only) for differentiating between multiple objects, variables or processes of the same type, in other words do not compulsorily indicate any dependence and/or sequence of these objects, variables or processes relative to one another. If any dependence and/or sequence is/are required, this is explicitly stated here or it is obvious to a person skilled in the art when studying the embodiment concretely described. If a component can occur multiple times ("at least one"), the description regarding one of these components can apply equally for all or part of the plurality of these components, but this is not compulsory.

BRIEF SUMMARY OF THE DRAWINGS

The disclosure will be explained in greater detail below, using the attached figures. It should be pointed out that the invention is not supposed to be restricted by the exemplary embodiments mentioned. In particular, it is also possible, unless explicitly stated otherwise, to extract partial aspects of the facts explained in the figures and to combine them with other integral parts and knowledge from the present description. In particular, it should be pointed out that the figures and the size ratios shown are only schematic. The figures show.

DESCRIPTION

Figure 1:
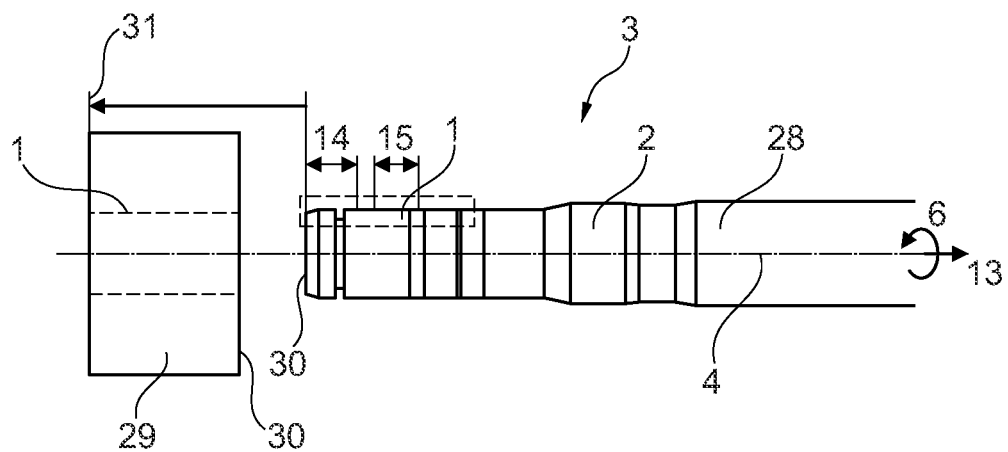
FIG. 1: a shaft and a hub for producing a shaft/hub connection, in a side view, partly in section.

FIG. 1 shows a shaft 28 and a hub 29 for producing a shaft/hub connection 3, in a side view, partly in section.

Shaft 28 and hub 29 each have a gear-tooth system 1, by way of which they are connected with one another (relative to the circumference direction 6, with shape fit). At least one of shaft 28 and hub 29 (here at least the shaft 28) is the component 2 described. To form the shaft/hub connection 3, the shaft 28 and the hub 29 (of the component shaft 28 and of the component hub 29; here, an end face, in each instance) can be displaced relative to and toward one another, along an axial direction 13, by way of a first component end 30. The first region 14 of the gear-tooth system 1 of the shaft 28 is disposed between the first component end 30 of the component 2 and the second region 15 of the component 2 (the shaft 28).

If shaft 28 and hub 29 are disposed one on top of the other, in other words displaced toward one another, first the first region 14 of the gear-tooth system 1 of the component 2 (here the shaft 28) will come into engagement with the gear-tooth system 1 of the other component (here the hub 29). The first region 14 has the enlarged tooth gap width, so that assembly of the shaft/hub connection 3 is simplified.

In this regard, the gear-tooth systems 1 (of shaft 28 and hub 29) first form a greater fit (for example a play fit) with one another when forming the shaft/hub connection 3 (if only the first region 14 is in engagement with the respectively other gear-tooth system 1). During further displacement of shaft 28 and hub 29 relative to one another and when a predetermined end position 31 is reached, the gear-tooth systems 1 form a tighter fit (for example a press fit) with one another, at least in the second region 15 of the gear-tooth system 1 of the component 2.

Figure 2:
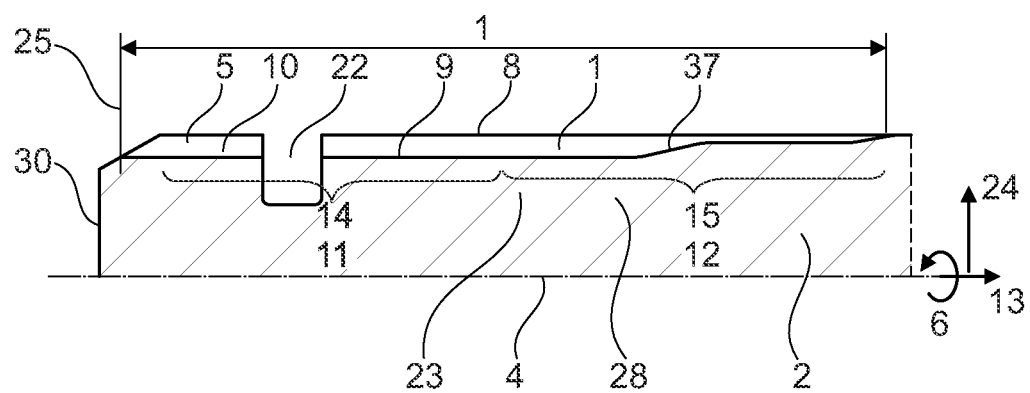
FIG. 2: a detail of the shaft according to FIG. 1 in a side view, in section.
Figure 3:
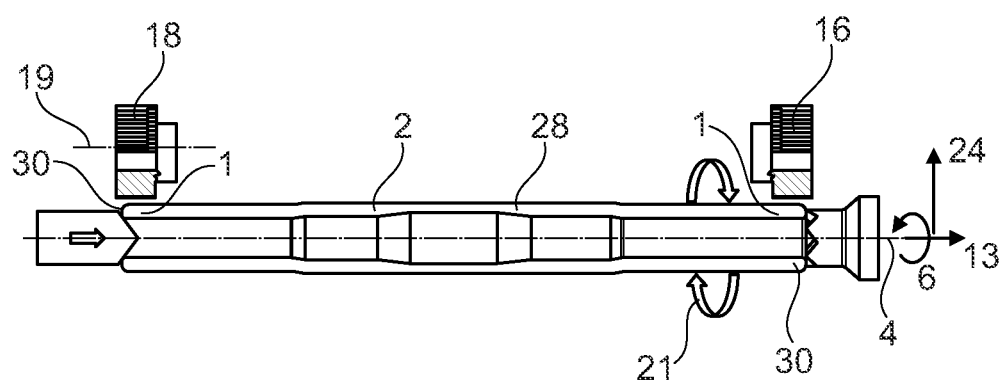
FIG. 3: an apparatus for producing the gear-tooth system on a shaft, in a side view.
Figure 4:
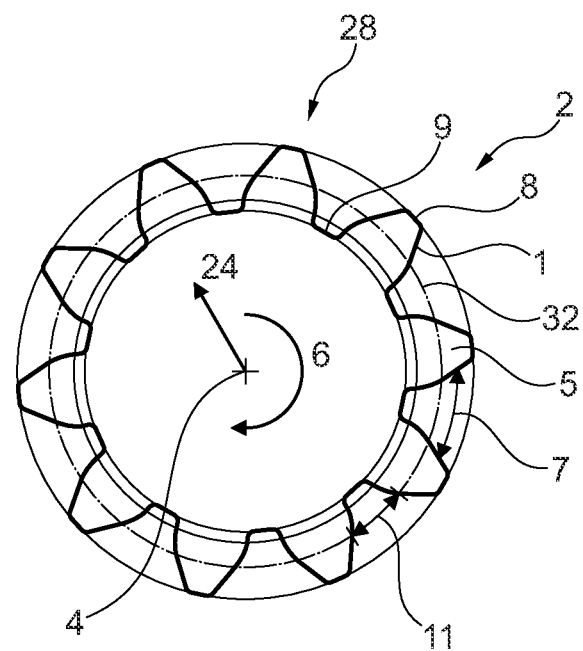
FIG. 4: a shaft having a gear-tooth system, in a view along the axial direction.
Figure 5:
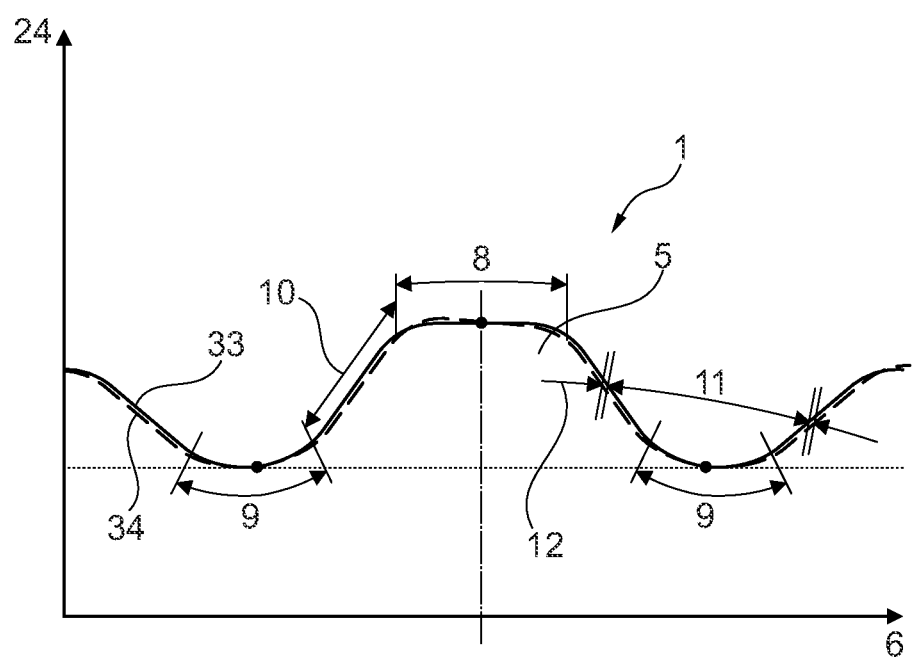
FIG. 5: a change in the gear-tooth system by means of Step b) of the method, shown using a cross-section; in a view along the axial direction.
Figure 6:
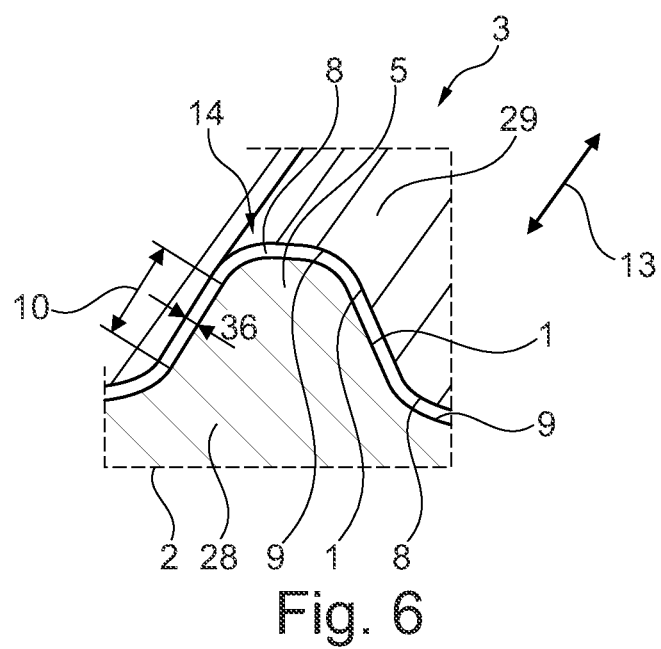
FIG. 6: a detail of a gear-tooth system of a shaft/hub connection, in a perspective view.
Figure 7:
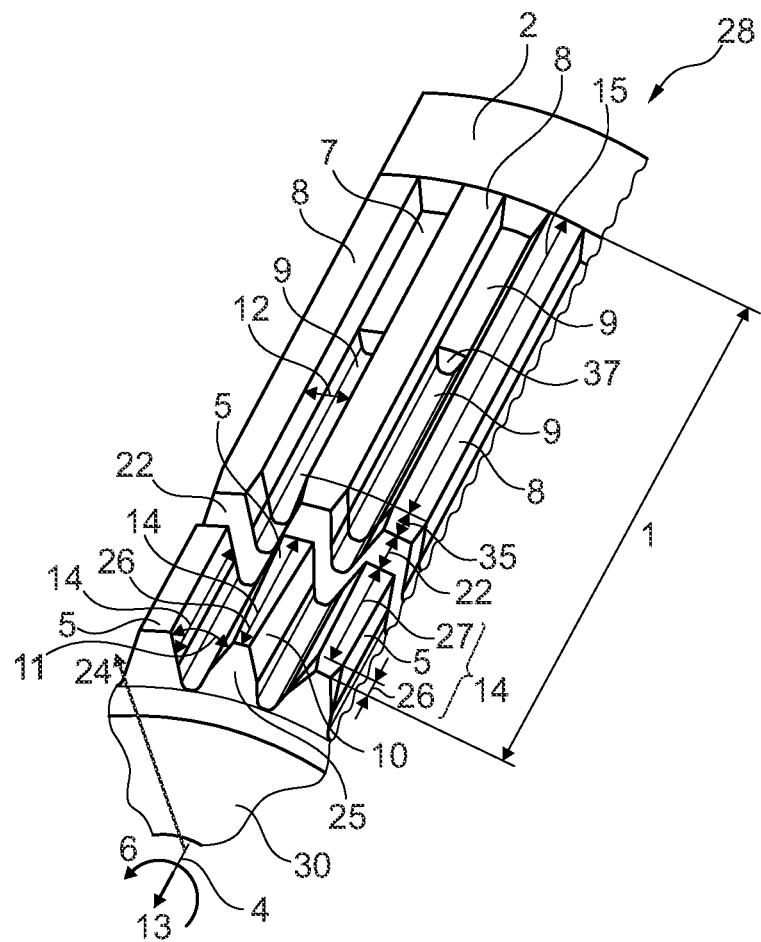
FIG. 7: multiple embodiment types of a gear-tooth system geometry, shown using different teeth of a shaft; in a perspective view.

FIG. 2 shows a detail of the shaft 28 according to FIG. 1 in a side view, in section. FIG. 3 shows an apparatus for producing the gear-tooth system 1 on a shaft 28, in a side view. FIG. 4 shows a shaft 28 having a gear-tooth system 1, in a view along the axial direction 13. FIG. 5 shows a change in the gear-tooth system 1 by means of Step b) of the method, represented using a cross-section; in a view along the axial direction 13. FIG. 6 shows a detail of a gear-tooth system 1 of a shaft/hub connection 3, in a perspective view. FIG. 7 shows multiple embodiment types of a gear-tooth system geometry, represented for different teeth 5 of a shaft 28; in a perspective view. FIGS. 2 to 7 will be described together hereinafter.

The gear-tooth system 1 is a straight gear-tooth system, in which the teeth 5 extend exclusively along the axial direction 13.

The component 2 forms a gear wheel having an outer gear-tooth system. The gear-tooth system 1 has a uniform division. The gear-tooth system 1 of the component 2 comprises a plurality of (equally configured) teeth 5, which are disposed next to one another along a circumference direction 6, wherein a tooth interstice 7 is disposed between two teeth 5, in each instance, and each tooth 5 has a head region 8 and a flank region 10, disposed between head region 8 and a foot region 9 disposed in the tooth interstice 7, in each instance. The tooth interstice 7 has a tooth gap width 11, 12 in the flank region 10. The gear-tooth system 1 has at least a first region 14 and subsequently a second region 15 along an axial direction 13 that lies parallel to the first axis of rotation 4.

The first region 14 has a first tooth gap width 11, and the second region 15 has a second tooth gap width 12, which is less, in comparison. The tooth gap width 11, 12 changes along a radial direction 24, between head region 8 and foot region 9 of the teeth 5 (see FIG. 4). Here, the (first and second) tooth gap width 11, 12 is determined at the same distance from the first axis of rotation 4, in each instance. The tooth gap width 11, 12 is determined in the flank region 10 of the teeth 5. A partial circle 32 (or rolling circle) extends through the flank region 10.

The gear-tooth system 1 according to FIGS. 2 and 7 is structured with steps (in other words differently structured foot regions 9 of the gear-tooth system 1).

According to the method for producing the gear-tooth system 1, according to Step a), the component 2 is made available in an initial state, wherein the component 2 has the gear-tooth system 1, and the gear-tooth system 1 has the (narrower) second tooth gap width 12 in the first region 14 and in the second region 15. According to Step b), machining of the first region 14 and enlargement of the second tooth gap width 12 to form the first tooth gap width 11 takes place (see FIGS. 2, 5, and 7).

Within the first region 14, a groove 22 that runs along the circumference direction 6 is introduced into the gear-tooth system 1. The groove 22 reaches deeper into the component 2 than the foot region 9 of the gear-tooth system 1.

During Step b), a material 23 of the component 2 is displaced, at least in the first region 14, out of the flank region 10, in a radial direction 24, at least toward the head region 8 or toward the foot region 9. In FIG. 5, it is shown that the gear-tooth system 1 has a second tooth gap width 12 before Step b) (first contour 33 of the gear-tooth system 1). After Step b), the gear-tooth system has a first tooth gap width 11 (second contour 34). It is evident that material 23 of the component 2 was displaced out of the flank region 10 into the head region 8 and into the foot region 9.

Figure 11:
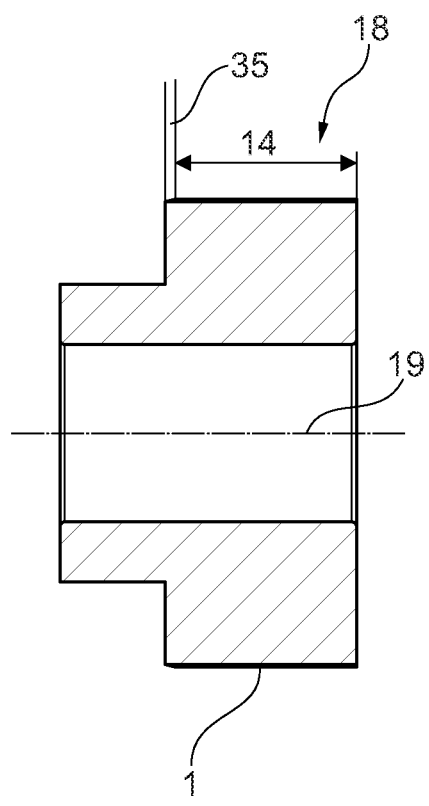
FIG. 11: the rolling wheel according to FIG. 10 in a side view, in section.

A transition region 35 is provided between the first region 14 and the second region 15, in which the first tooth gap width 11 is continuously reduced, along the axial direction 13, toward the second tooth gap width 12. To implement this transition region 35, the rolling tool can have a corresponding shape, for example, so that an increasingly lesser engagement between rolling tool and gear-tooth system 1 of the component 2 takes place toward the edge of the rolling tool (see FIG. 11, shown there using a rolling wheel 18).

In FIG. 3, it is shown that the shaft 28 is disposed in a clamping arrangement on both sides, and is machined, at both component ends 30, using a rolling tool to produce the gear-tooth system 1.

Here, only the second tooth gap width 12 is produced by way of the rolling tool (in other words the state of the shaft 28 before Step b) of the method). Machining according to Step b) can take place in a similar clamping arrangement, with different rolling wheels 18.

A rolling wheel 18 having a second axis of rotation 19 (left rolling tool) can be used as a rolling tool (see also FIGS. 8 to 11) or a rolling rod 16 (right rolling tool) can be used, which is moved transverse to the first axis of rotation 4 relative to the component 2. A function of the rolling rod is explained in DE 11 2005 003 630 B4, for example.

In FIG. 6, it is shown that if shaft 28 and hub 29 are disposed one on top of the other, in other words displaced toward one another, first the first region 14 of the gear-tooth system 1 of the component 2 comes into engagement with the gear-tooth system 1 of the other component of shaft 28 and hub 29. The first region 14 has the enlarged first tooth gap width 12, so assembly of the shaft/hub connection 3 is simplified by means of the greater play 36 in the flank region 10.

In FIG. 7, multiple types of a gear-tooth system geometry are shown. The teeth 5 extend along the axial direction 13, proceeding from the first component end 30. In the foot region 9 of the gear-tooth system 1, steps are arranged in the second region.

The tooth 5 shown on the left extends along the axial direction 13 with a flank region 10 that runs parallel to the axial direction 13. In interplay with similar teeth 5, a constant first tooth gap width 11 is formed in this way, along the axial direction 13, in the first region 14.

In the case of the center tooth 5, the flank regions 10 run at an angle relative to the axial direction 13, so that in interplay with similar teeth 5, a first tooth gap width 11 that is continuously reduced is implemented. The first tooth gap width 11 is continuously reduced, proceeding from a first region end 25 of the first region 14 (here at the first component end 30) and toward the second region 15, over the entire first region 14.

The center tooth 5 is structured conically, at least in the first region 14, i.e. it widens continuously toward the second region 15.

In the case of the right tooth 5, only a partial region 26 of the first region 14 is structured conically, so that the tooth 5 widens continuously toward the second region 15 only in the partial region 26.

The partial region 26 is disposed directly at the first region end 25, wherein a remaining region 27 having a constant first tooth gap width 11 (in other words with flank regions 10 of the teeth 5 that run parallel to the axial direction 13) is disposed between the partial region 26 and the second region 15. The remaining region 27 is part of the first region 14. The remaining region 27 is disposed between the partial region 26 and the groove 22.

In the case of all the teeth 5 of the different gear-tooth systems shown, the transition region 35 is disposed directly following the groove 22 and toward the second region 15.

The transition region 35 of each tooth 5 is disposed between the first region 14 and the second region 15 and structured like the partial region 26 of the right two teeth 5, wherein in the transition region 35, the first tooth gap width 11 is reduced to the second tooth gap width 12.

For all the gear-tooth systems 1 shown, it holds true that in the entire first region 14, the first tooth gap width 11 is greater than the second tooth gap width 12 in the second region 15.

The gear-tooth system 1 extends, proceeding from a first region end 25 (disposed at the first component end 30) of the first region 14, along the axial direction 13, over the first region 14 (and the groove 22), over a transition region 35, and over the second region 15.

Figure 8:
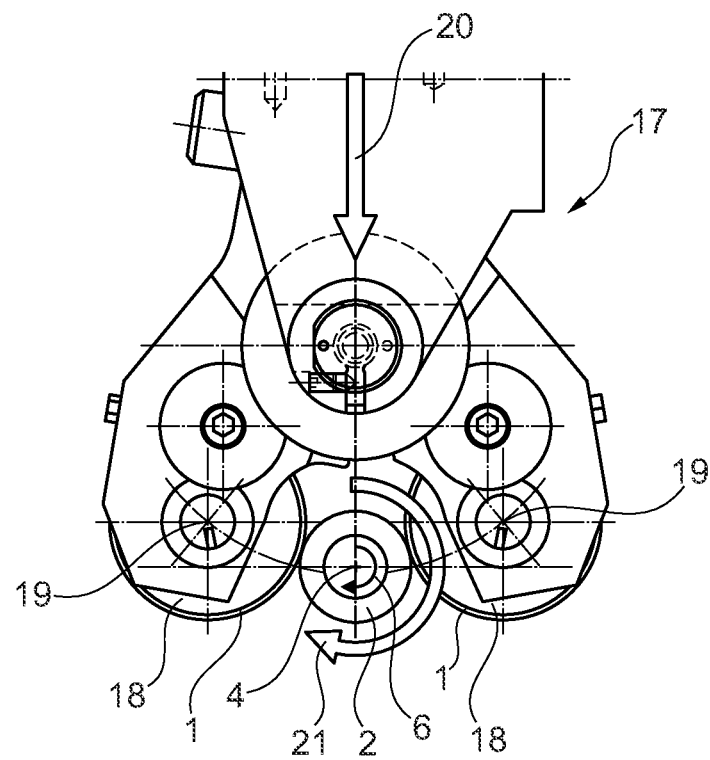
FIG. 8: a roller burnishing tool for machining the gear-tooth system according to Step b), in engagement with a component, in a side view, in section.
Figure 9:
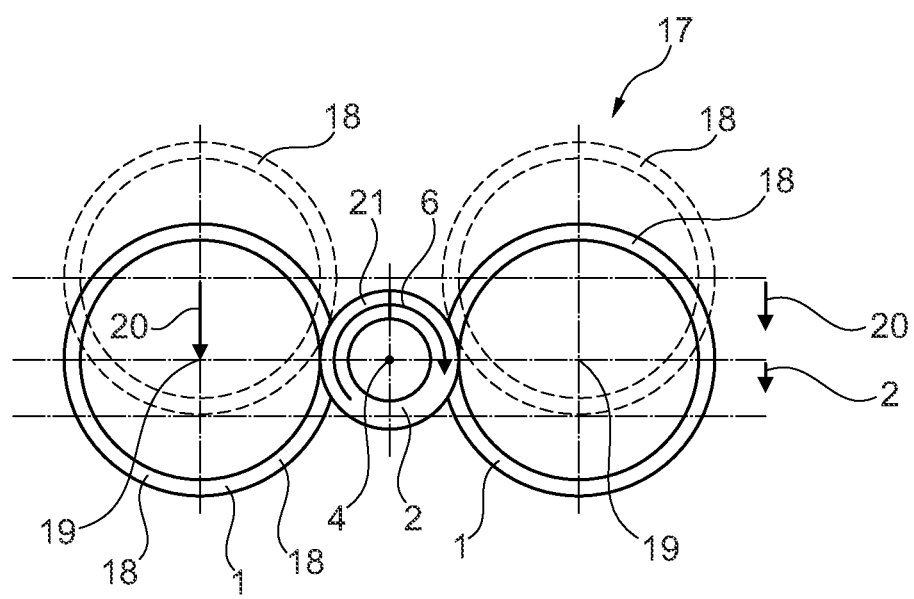
FIG. 9: a progression of machining the gear-tooth system according to FIG. 8, in a side view, in section.

FIG. 8 shows a roller burnishing tool 17 for machining the gear-tooth system 1 according to Step b), in engagement with a component 2, in a side view, in section. FIG. 9 shows a progression of machining of the gear-tooth system 1 according to FIG. 8, in a side view, in section. FIGS. 8 and 9 will be described together hereinafter. Reference is made to the explanations regarding FIGS. 1 to 7.

The rolling tool is a roller burnishing tool 17, wherein the two rolling wheels 18 for producing the engagement into the gear-tooth system 1 on component 2 are moved at least transverse to the axial direction 13, at an infeed speed 19. Immediately before contact of rolling wheels 18 and component 2, at least the component 2 rotates about the first axis of rotation 4.

Here, only the component 2 is driven, so that a rotational movement of the component 2 is transferred to the rolling wheels 18.

The roller burnishing tool 17 is moved toward the component 2 at an infeed speed 19, wherein within the scope of this infeed movement, the contact, the engagement into the gear-tooth system 1 (in other words the interaction between gear-tooth system 1 on the rolling wheel 18 and on the component 2) and, if applicable, also the transfer of the rotational movement from the one part to the other part takes place.

In FIG. 9, the broken-line representation of the rolling wheel 18 represents the position of the rolling wheel 18 at the moment of production of the first contact between the gear-tooth system 1 of the rolling wheel 18 and the gear-tooth system 1 of the component 2. The representation of the rolling wheel with a solid line represents the position of the rolling wheel 18 when machining of the gear-tooth system 1 in the first region 14 according to Step b) of the method has just taken place. During the advancing movement of the rolling wheels 18 along a direction transverse to the axial direction 13 or transverse to the first axis of rotation 4, the rolling wheels 18 are disposed at a constant distance from one another.

Figure 10:
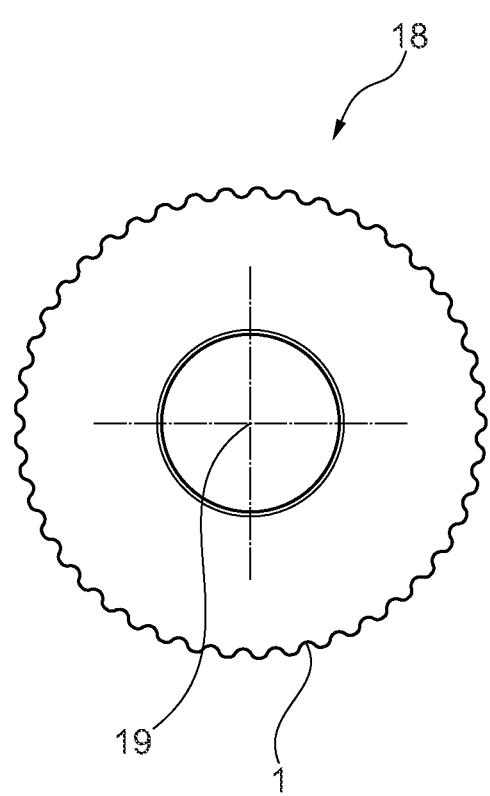
FIG. 10: a rolling wheel of the roller burnishing tool according to FIGS. 8 and 9 in a view along a second axis of rotation.

FIG. 10 shows a rolling wheel 18 of the roller burnishing tool 17 according to FIGS. 8 and 9 in a view along a second axis of rotation 19 of the rolling wheel 18. FIG. 11 shows the rolling wheel 18 according to FIG. 10 in a side view, in section. FIGS. 10 and 11 will be described together hereinafter. Reference is made to the explanations regarding FIGS. 1 to 9.

The rolling wheel 18 has a gear-tooth system 1 for forming the first tooth gap width 11.

A transition region 35 can be provided between the first region 14 and the second region 15, in which the first tooth gap width 11 is continuously reduced in size along the axial direction 13, toward the second tooth gap width 12. To implement this transition region 35, the rolling tool (here the rolling wheel 18) can have a corresponding shape, so that increasingly lesser engagement between rolling tool and gear-tooth system 1 of the component 2 occurs toward the edge of the rolling tool. Here, the rolling wheel 18 has a transition region 35 described in connection with FIG. 7.

REFERENCE SYMBOL LIST 1 gear-tooth system
2 component
3 shaft/hub connection
4 first axis of rotation
5 tooth
6 circumference direction
7 tooth interstice
8 head region
9 foot region
10 flank region
11 first tooth gap width
12 second tooth gap width 13 axial direction
14 first region
15 second region
16 rolling rod
17 roller burnishing tool
18 rolling wheel
19 second axis of rotation
20 infeed speed
21 rotational speed
22 groove
23 material
24 radial direction
25 first region end
26 partial region
27 remaining region
28 shaft
29 hub
30 first component end
31 end position
32 partial circle
33 first progression
34 second progression
35 transition region
36 play
37 step

The invention claimed is:

1. A method for producing a gear-tooth system in a final state on a component of a shaft/hub connection; wherein the method comprises at least the following steps:

a) providing the component in a first initial state, wherein the component has a first axis of rotation and the gear-tooth system in an initial state, wherein the gear-tooth system in the initial state comprises a plurality of teeth, which are disposed next to one another along a circumference direction, wherein a tooth interstice is disposed between two teeth, in each instance, and each tooth has a head region and a flank region, in each instance, disposed between head region and a foot region disposed in the tooth interstice, wherein the tooth interstice has a tooth gap width in the flank region; wherein the gear-tooth system in the initial state has at least a first region and subsequently a second region along an axial direction parallel to the first axis of rotation, wherein the gear-tooth system has a second tooth gap width in the first region and in the second region; and b) machining at least the first region and enlarging the second tooth gap width to form a first tooth gap width, wherein, after Step b), the component has the gear-tooth system in the final state;

wherein, after Step b), the first region has the first tooth gap width, and the second region has the second tooth gap width, which is less in comparison;

wherein Step b) is carried out using a rolling tool; and wherein a different tool is used for producing the first tooth gap width than for producing the gear-tooth system in the initial state or for producing the second tooth gap width.

2. The method according to claim 1, wherein:

the rolling tool is a rolling rod, which is moved at least transverse to the first axis of rotation relative to the component to produce the gear-tooth system in the final state; or the rolling tool is a roller burnishing tool having at least one rolling wheel, wherein the rolling wheel has a second axis of rotation that runs parallel to the first axis of rotation.

3. The method according to claim 2, wherein the rolling tool is the roller burnishing tool, wherein the at least one rolling wheel is moved at least transverse to the axial direction, at an infeed speed, for producing an engagement into the gear-tooth system in the initial state, wherein immediately before contact of the at least one rolling wheel and component, at least the component rotates about the first axis of rotation or the at least one rolling wheel rotates about the second axis of rotation.

4. The method according to claim 3, wherein the infeed speed is at least 0.2 millimeters per second.

5. The method according to claim 3, wherein a rotational speed of the component is at least 100 revolutions per minute during Step b).

6. The method according to claim 3, wherein further comprising, between Step a) and b), introducing, within the first region, a groove that runs along the circumference direction into the gear-tooth system in the initial state.

7. The method according to claim 3, wherein during Step b), a material of the component is displaced out of the flank region, at least in a radial direction, at least toward the head region or toward the foot region, at least in the first region.

* * * * *